(12) United States Patent
Kreh

(10) Patent No.: US 8,519,024 B2
(45) Date of Patent: Aug. 27, 2013

(54) INTUMESCENT FIREPROOFING SYSTEMS AND METHODS

(75) Inventor: Robert Paul Kreh, Middle River, MD (US)

(73) Assignee: United States Mineral Products NJ (US)

( * ) Notice: Subject to any disclaimer, the term of this patent is extended or adjusted under 35 U.S.C. 154(b) by 0 days.

(21) Appl. No.: 13/270,734

(22) Filed: Oct. 11, 2011

(65) Prior Publication Data

US 2013/0090410 A1 Apr. 11, 2013

(51) Int. Cl.
*C08K 5/02* (2006.01)
*C08K 5/07* (2006.01)
*C08K 5/10* (2006.01)
*C08K 5/52* (2006.01)
*C08K 5/103* (2006.01)
*C08K 3/34* (2006.01)
*C08K 3/40* (2006.01)

(52) U.S. Cl.
USPC ........... 523/179; 524/100; 524/127; 524/317; 524/354; 524/413; 524/445; 524/494

(58) Field of Classification Search
USPC ............... 523/179; 524/100, 127, 317, 354, 524/413, 445, 494
See application file for complete search history.

(56) References Cited

U.S. PATENT DOCUMENTS

| | | | | |
|---|---|---|---|---|
| 3,914,193 | A | * | 10/1975 | Fessler et al. ................. 523/179 |
| 6,001,912 | A | * | 12/1999 | Schneider ..................... 524/388 |
| 2002/0176979 | A1 | * | 11/2002 | Evans ........................ 428/292.1 |
| 2005/0112374 | A1 | * | 5/2005 | Jaffee et al. .................... 428/375 |

OTHER PUBLICATIONS

Perstorp, Charmor: Protecting People & Property, 2011, available at http://perstorp.com/upload/charmor_eng_2011.pdf.
UCAR Emulsion Systems, Latex 367 Product Information Sheet (Mar. 1996), available at http://www.arkema-inc.com/literature/pdf/864.pdf.
LyondellBasell Industrial Holdings, Arcosolv TPNB Solvent Technical Data (May 2010), available at www.lyondellbasell.com/techlit/techlit/2247.pdf.
International Search Report and Written Opinion for PCT/US12/59735 dated Nov. 6, 2012.

* cited by examiner

*Primary Examiner* — Kriellion Sanders
(74) *Attorney, Agent, or Firm* — McCarter & English, LLP

(57) ABSTRACT

Water-based intumescent fireproofing formulations are provided that exhibit excellent fireproofing properties while simultaneously significantly reducing and/or eliminating the potential for VOC release and exhibiting excellent hangability properties. The intumescent fireproofing formulation includes a coalescent that significantly reduces and/or eliminates the potential for VOC release and fiber constituents, e.g., fibers of greater than 0.2 mm in length. Exemplary coalescents have a boiling point of at least 180° C. and include bis(2-ethylhexanoate) triethyleneglycol and 2,2,4-trimethyl-1,3-pentanediolmono(2-methylproponate). Intumescent fireproofing formulations are also provided that include clay to further improve performance.

23 Claims, No Drawings

INTUMESCENT FIREPROOFING SYSTEMS AND METHODS

BACKGROUND

1. Technical Field

The present disclosure is directed generally to fireproofing and, more particularly, to intumescent fireproofing systems and methods that generate and release reduced levels of volatile organic compounds (VOCs) and exhibit improved performance characteristics.

2. Background Art

Fireproofing is used in a variety of construction settings to provide fire retardation and thermal protection in the event of a fire. While a variety of techniques have been used to apply fireproofing, fire resistant and/or fire retardant materials in the course of construction, a common method consists of spraying or otherwise applying a fireproofing material onto combustible or heat-sensitive surfaces, e.g., wood, foam insulation, structural steel, floors or walls, to protect such surfaces from fire and heat. It is frequently necessary to apply multiple coats of a fireproofing material to achieve desired levels of fire retardation and/or to comply with applicable building codes.

It is well known in the industry that intumescent fireproofing materials are useful and effective in protecting combustible or heat-sensitive surfaces. Specifically, a significant characteristic of intumescent materials is that they swell or expand into a thick foam char as a result of heat exposure, resulting in increased volume and decreased density. The thick foam char is a poor conductor of heat and thereby possesses heat-insulative and fire-retardant properties. The heat activated reaction causing the expansion of thick foam char also typically generates inert gases, e.g., nitrogen, carbon dioxide, etc., which are entrapped in the foam and, thus, prevent or inhibit air access to a combustible surface. Because the original intumescent coating expands substantially to many times its original thickness, the thick foam char contributes meaningful insulation to the combustible or heat-sensitive surface and may serve as an effective fireproofing agent.

Typical intumescent compositions are shown at "http://perstorp.com/uploadlcharmor_eng_2011.pdf" and "http://www.arkema-inc.com/literature/pdf/864.pdf" Intumescent compositions generally contain a series of basic ingredients (and potentially additional ingredients) as described herein. A resin is generally included and employed to hold the coating together. A coalescent is generally included to aid in the film formation of the resin. A phosphate, such as ammonium polyphosphate (APP) or melamine pyrophosphate, is included and employed to provide (i) expansion gases, (ii) phosphorus acids to decompose carbon-containing chemicals, and (iii) a resultant phosphorus-containing structure to the char. Sugars, such as pentaerythritol or dipentaerythritol, are included and used as carbon-containing chemicals providing structure to the intumescent foam. A chemical, such as melamine, is generally included and used to generate gas during a fire, providing for char expansion. Inorganic solids, such as titanic, are generally included and used for char stabilization. An exemplary ratio for APP/pentaerythritol/melamine/titania of approximately 3:1:1:1 is known to provide an effective intumescent composition.

However, there are opportunities for improvement with respect to intumescent fireproofing materials currently utilized in the industry. For example, intumescent fireproofing materials currently utilized in the industry include constituents that release volatile organic compounds ("VOCs") during and/or after application, and/or when exposed to heat/fire conditions. VOCs are organic chemicals, often toxic and odiferous, which have boiling points resulting in significant vaporization/release from the liquid or solid state. As a result, undesirably large quantities of VOCs may be released from conventional fireproofing materials. As is well known, some VOCs have been found to cause harmful long-term health effects to humans and are harmful to the environment. Thus, it would be desirable to reduce and/or eliminate the potential for VOC release when developing intumescent fireproofing formulations.

However, the potential elimination of constituents that release VOCs from intumescent fireproofing formulations raises a host of related issues. In particular, the overall performance and commercial viability of intumescent fireproofing compositions require materials that simultaneously yield acceptable thermal performance and application characteristics. Indeed, in the absence of acceptable thermal performance, a proposed intumescent fireproofing formulation is not worthy of consideration.

In terms of application characteristics, one metric by which intumescent fireproofing compositions are measured is "hangability", i.e., the degree to which the intumescent fireproofing composition remains in a desired application location without undue dripping, sliding, sagging or migration. If an intumescent fireproofing composition exhibits poor hangability, the use of such material may require the application of "thinner" coats to mitigate the inherent hangability limitations of the composition. Specifically, "sagging" refers to situations where the intumescent fireproofing coating moves downward within a desired coating area, whereas "sliding" refers to situations where the intumescent fireproofing coating moves downward below a desired coating area. Among the implications of an intumescent fireproofing composition that exhibits poor hangability characteristics is thin, non-uniform thickness build of the intumescent fireproofing coating, diminishing the surface appearance of the coating, and potentially creating insufficient and uneven fire protection to the combustible or heat-sensitive surface coated.

Moreover and as is well known to persons skilled in the art, the economics of intumescent fireproofing operations are strongly influenced by the thickness that may be applied in a single coat and the degree to which the intumescent fireproofing material may be relied upon to remain in a desired location, i.e., not drip, slide, sag or otherwise migrate to an unacceptable degree. Poor hangability has a clear negative effect on the noted economics because thinner individual coats must be employed, requiring more total coats to achieve requisite fireproofing performance with a concomitant investment of time and expense. Still further, uneven fireproofing thickness may result in thermal failure, thereby undermining the fundamental purpose of the intumescent composition. In addition, uneven fireproofing thickness results in an unacceptable visual appearance, further undermining the beneficial attributes associated with high quality intumescent products. Indeed, an important attribute of commercially viable intumescent compositions is the delivery of a substantially smooth visual appearance when applied to a substrate.

A further issue encountered in the formulation and use of intumescent fireproofing materials is the characteristic of a strong and generally unpleasant odor associated with conventional intumescent products. The elimination and/or masking of such odors would be beneficial to the fireproofing field.

Thus, a need exists for intumescent fireproofing compositions that substantially decrease and/or eliminate the potential for VOC release while simultaneously exhibiting requisite fireproofing properties, including superior thermal performance, desirable hangability properties, and a substantially smooth visual appearance. It is further desired to provide an intumescent fireproofing composition that decreases and/or eliminates the unpleasant odor associated with conventional intumescent fireproofing materials. These and other needs are addressed by the present disclosure.

SUMMARY

It is an object of the present disclosure to provide intumescent fireproofing formulations that substantially decrease and/or eliminate the potential for VOC release, while simultaneously delivering excellent fireproofing performance, e.g., superior thermal performance, hangability and smooth visual appearance. It is a further object of the present disclosure to provide intumescent fireproofing formulations that decrease and/or eliminate the unpleasant odor—e.g., volatile organic coalescent, ammonia and/or resin smells—associated with conventional intumescent fireproofing compositions.

In accordance with embodiments of the present disclosure, advantageous water-based intumescent fireproofing formulations are disclosed that satisfy the above-noted objectives. In particular, the disclosed intumescent fireproofing compositions advantageously exhibit excellent fireproofing properties while simultaneously significantly reducing and/or eliminating the potential for VOC release and exhibiting excellent hangability and visual appearance properties. Indeed, the disclosed intumescent fireproofing compositions synergistically achieve a host of advantageous results, as described in greater detail below.

According to exemplary embodiments of the present disclosure, intumescent fireproofing formulation are disclosed that include, inter alia, a coalescent that significantly reduces and/or eliminates the potential for VOC release. Exemplary formulations according to the present disclosure also include, inter alia, fiber constituents, e.g., glass fibers of greater than 0.2 mm in length, such fiber constituents contributing to improved hangability and thereby allowing applications that are thicker and/or more resistant to dripping, slipping, sagging and/or migrating. Exemplary intumescent implementations of the present disclosure include fibers having lengths of 2 mm to 6 mm. The improved hangability of the disclosed formulations permit more intumescent fireproofing material to be applied at one time, resulting in a reduction of cost to an applicator, while simultaneously achieving desired fireproofing properties.

In exemplary embodiments of the present disclosure, the intumescent formulation includes a coalescent having low volatility. For purposes of the disclosed intumescent formulations, the boiling point of the coalescent is typically greater than 180° C., preferably greater than 240° C., and most preferably greater than 300° C. Exemplary coalescents for use according to the present disclosure include bis(2-ethylhexanoate) triethyleneglycol, 2,2,4-trimethyl-1,3-pentanediol-mono(2-methylpropanoate), and combinations thereof. The bis(2-ethylhexanoate) triethyleneglycol is commercially available as Solusolv™ 2075.

Further exemplary formulations of the present disclosure include odor control agent(s), e.g., methyl salicylate, benzaldehyde, trans-cinnamonaldehyde and/or vanillin, to mask and/or eliminate undesirable odors associated with the disclosed intumescent fireproofing composition.

In an exemplary embodiment, an intumescent fireproofing formulation is provided that synergizes the effects of low (including zero) VOC-releasing coalescent(s) with the use of fibers to improve hangability of the intumescent fireproofing composition, e.g., when applied at a wet thickness of at least 0:25 mm. The disclosed fibers may take the form of glass fibers, e.g., glass fibers having a length of ≧0.2 mm in length. In further exemplary embodiments, the fibers are at least about 0.5 mm in length; and in still further exemplary embodiments the fibers are on the order of 2 mm to 6 mm in length. Other types of fibers may be employed according to the present disclosure, e.g., ceramic fibers such as mineral wool, alumina, alumina-magnesia-silica, aluminosilicate, silica, zirconia, quartz fibers and the like. The overall formulation exhibits superior thermal performance while simultaneously achieving enhanced hangability performance, e.g., relative to control samples, and an advantageous visual appearance, i.e., a substantially smooth appearance when applied to a substrate at conventional thicknesses, e.g., at a thickness of at least 0.25 mm per application. Of note, application thicknesses vary in practice, ranging for example from about 0.25 mm per application to about 1 mm per application.

In another exemplary embodiment, an intumescent fireproofing formulation is provided that builds upon the previously-noted formulation (i.e., low/zero VOC-releasing coalescent(s) and fibers, e.g., glass fibers), with the additional inclusion of a clay constituent. Clay is a fine-grained aluminum silicate mineral, generally classified into kaolinite, chlorite, illite and montmorillonite-smectite. An exemplary clay used in the disclosed intumescent formulations is "bentonite", an aluminum phyllosilicate. However, the present disclosure is not limited by or to such exemplary clay material. The disclosed clay-containing intumescent formulations exhibit hangability that is further improved, e.g., relative to control samples, and exhibits a substantially smooth visual appearance, e.g., when applied at a thickness of at least 0.25 mm per coating application.

The exemplary intumescent fireproofing embodiments disclosed herein directly address and improve upon properties associated with intumescent fireproofing formulations currently utilized in the industry. Specifically, the exemplary intumescent fireproofing embodiments disclosed herein achieve a reduced and/or eliminated potential for VOC release, while simultaneously providing advantageous thermal properties, superior hangability and a substantially smooth visual appearance when applied to a substrate. In further exemplary embodiments, advantageous reduction in undesirable odor release is achieved. The combination of benefits conferred by the disclosed intumescent fireproofing formulations thereby create an efficient and cost effective product. The beneficial properties of the disclosed intumescent fireproofing compositions translate directly to benefits in the application and use thereof.

Additional features, functions and benefits associated with the disclosed intumescent fireproofing compositions will be apparent from the detailed description which follows.

DESCRIPTION OF EXEMPLARY EMBODIMENT(S)

In accordance with embodiments of the present disclosure, advantageous water-based intumescent fireproofing formulations are disclosed. The advantageous formulations and associated properties are illustrated by the following examples. However, it is to be understood that the present disclosure is not limited by or to the specific formulations disclosed herein. Rather, the beneficial properties of the disclosed intumescent fireproofing compositions may be achieved—based on the teachings of the present disclosure—with different individual formulation constituents that are selected based upon and/or to replace or replicate the properties of the disclosed constituents, e.g., alternative defoamers, resins, thickeners and the like.

The following examples allow a comparison between the properties of intumescent fireproofing formulations that include/exclude glass fibers, include coalescent constituents exhibiting different volatilities and associated VOC potential, and that include/exclude a clay constituent. The volatilities of the disclosed coalescents are expressed as boiling points, where higher boiling points correlate to lower volatility.

The base intumescent fireproofing formulation utilized in the following examples, except as specifically noted, was prepared by mixing the following ingredients:

BASE FORMULATION

| Ingredient | % by Weight |
|---|---|
| Water | 20.59 |
| Defoamer | 0.11 |
| Surfactant | 0.41 |
| Ammonium Polyphosphate | 26.76 |
| Titania | 10.29 |
| Melamine | 8.75 |
| Pentaerythritol | 8.75 |
| Resin | 22.65 |
| 2-butoxyethanol (coalescent) | 1.54 |
| Thickener | 0.15 |

The specific ingredients utilized in the reported examples (unless otherwise noted) are as follows. However, it is to be understood that the present disclosure is not limited by or to these exemplary ingredients.

The Defoamer is BYK 034 available from BYK USA, Inc.
The Surfactant is the Surfactol 365 available from Vertellus Specialties, Inc.
The Ammonium Polyphosphate is AP422 available from Clariant GmbH
The Titania is Kronos 2300 available from Kronos, Inc.
The Melamine is Micromel 325 available from Total Specialty Chemicals
The Pentaerythritol is Penta-Powder 325 available from Total Specialty Chemicals
The Resin is UCAR 367 available from Arkema, Inc.
The 2-butoxyethanol is Glycol Ether EB available from Ashland, Inc.
The Thickener is Natrosol® 250 HBR available from Ashland, Inc.

In preparing the noted formulation, the first seven (7) ingredients listed in the table above were initially mixed together, followed by vigorous mixing for one (1) hour. Ingredient 8 was then added, followed by five (5) minutes of mixing. Addition of ingredient 9 was followed by fifteen (15) minutes of mixing and the addition of ingredient 10 was followed by one (1) hour of mixing. In examples where glass fibers were included, the glass fibers were added after ingredient 8 and mixed for twenty five (25) minutes prior to addition of ingredient 9.

In performing experimentation of the base formulation and improvements thereof, a variety of coalescents were utilized and are shown in the table below. The effects of each of the tested coalescents are noted in the examples below.

TABLE

TESTED COALESCENTS

| Chemical Name | Trade Name | Source | Boiling Point |
|---|---|---|---|
| Propylene glycol monomethyl ether acetate | Glycol Ether PM Acetate | Ashland Inc., Covington, KY | 145° C. |
| 2-butoxyethanol | Glycol Ether EB | Ashland Inc., Covington, KY | 171° C. |
| Dipropylene glycol monomethyl ether | Glycol Ether DPM | Ashland Inc., Covington, KY | 188° C. |
| 2,2,4-trimethyl-1,3-pentanediolmono(2-methylpropanoate) | Texanol Ester Alcohol | Sigma-Aldrich Co., Milwaukee, WI | 258° C. |
| Bis(2-ethylhexanoate) triethylene glycol | Solusolv™ 2075 | Solutia, Inc., St. Louis, MO | 344° C. |
| Dioctyl phtalate | None | Sigma-Aldrich Co., Milwaukee, WI | 384° C. |

Hangability was evaluated for each example as follows. An area of 6.35 cm by 6.35 cm at the top of a 6.35 cm by 15.24 cm primed metal coupon was coated with 3.1 grams of the formulation to be evaluated. The coated coupon was then put in a stand that held it vertically at 24° C. and 45% relative humidity. Over the next thirty (30) minutes, the coated coupon was observed for signs of sagging or sliding. The coated coupon was then allowed to dry for four (4) days at these environmental conditions, at which time the dry film thickness ("dft") of the coating was measured at nine (9) spots, spread evenly over the coated area. These observations and measurements show the degree of sagging and sliding. Sagging is defined here as the moving downward of material within the coated area. Sliding is defined here as the moving downward of material below the coated area.

EXAMPLE 1

Comparative Sample

Formulation 1 used 1.5% by weight of coalescing agent 2-butoxyethanol. Formulation 1 shall be considered as the base formulation and was tested at 24° C. with a 45% relative humidity.

After applying the wet material, two large drips slid down the vertical coupon below the original area of the applied coating. The following table shows the dry film thicknesses in the area where material had been applied.

EXAMPLE 1

Results

| | Left Average (dft; mm): | Center Average (dft; mm): | Right Average (dft; mm): | Overall Average (dft; mm): |
|---|---|---|---|---|
| Top | 0.299 | 0.342 | 0.214 | 0.285 |
| Middle | 0.318 | 0.294 | 0.258 | 0.290 |
| Bottom | 0.307 | 0.326 | 0.283 | 0.305 |
| Average | 0.308 | 0.321 | 0.252 | 0.293 |

Although drips were clearly observed, no significant differences were found in dry film thicknesses between the top, middle and bottom regions of the coated area. This "sliding" constitutes poor hangability.

EXAMPLE 2

Comparative Sample

In Formulation 2, the coalescing agent of Formulation 1 was replaced with bis(2-ethylhexanoate)triethyleneglycol (Solusolv™ 2075). Formulation 2 was tested at 24° C. with a 45% relative humidity.

After applying the wet material, three large drips slid down the vertical coupon below the original area of the applied coating. The following table shows the dry film thicknesses in the area where material had been applied.

EXAMPLE 2

Results

|  | Left Average (dft; mm): | Center Average (dft; mm): | Right Average (dft; mm): | Overall Average (dft; mm): |
| --- | --- | --- | --- | --- |
| Top | 0.227 | 0.217 | 0.237 | 0.227 |
| Middle | 0.237 | 0.229 | 0.230 | 0.232 |
| Bottom | 0.211 | 0.236 | 0.271 | 0.239 |
| Average | 0.225 | 0.227 | 0.246 | 0.233 |

Similarly to Formulation 1, although drips were clearly observed, no significant differences were found in dry film thicknesses between the top, middle and bottom regions of the coated area. This "sliding" indicates poor hangability. Further, Examples 1 and 2 show that, in the absence of the fibers (included in subsequent examples), no benefit in hangability was obtained by replacing 2-butoxyethanol with the coalescent bis(2-ethylhexanoate) triethyleneglycol (Solusolv™ 2075). However, inclusion of the noted coalescent significantly reduced and/or eliminated the potential for VOC release in Formulation 2 relative to Formulation 1.

EXAMPLE 3

Comparative Sample

Formulation 3 was identical to Formulation 1, except that part of the Titania (a powdered solid) was replaced with glass fibers of approximately 3 mm in length. The resultant fiber concentration was 1.5% of the total formulation. Formulation 3 was tested at 24° C. with a 45% relative humidity.

After applying the material, none of the material dripped below the originally coated area, but the top portion of the coated area was observed to be moving downward ("sagging"), resulting in a very thin and uneven covering near the top. The following table shows the dry film thicknesses in the area where material had been applied.

EXAMPLE 3

Results

|  | Left Average (dft; mm): | Center Average (dft; mm): | Right Average (dft; mm): | Overall Average (dft; mm): |
| --- | --- | --- | --- | --- |
| Top | 0.084 | 0.200 | 0.260 | 0.181 |
| Middle | 0.475 | 0.082 | 0.063 | 0.207 |
| Bottom | 0.423 | 0.539 | 0.808 | 0.590 |
| Average | 0.327 | 0.274 | 0.377 | 0.326 |

The dry film thicknesses in the table above clearly show sagging within the coated area for Formulation 3, which contains 2-butoxyethanol as the coalescent and fibers.

EXAMPLE 4

Formulation 4 was identical to Formulation 2 except that—as with Example 3—part of the Titania (powdered solid) was replaced with glass fibers of approximately 3 mm in length. Again, the resultant fiber concentration was 1.5% of the total formulation. Formulation 4 was tested at 24° C. with a 45% relative humidity.

After applying the material, no sagging or sliding was observed. The following table shows the dry film thicknesses in the area where material had been applied.

EXAMPLE 4

Results

|  | Left Average (dft; mm): | Center Average (dft; mm): | Right Average (dft; mm): | Overall Average (dft; mm): |
| --- | --- | --- | --- | --- |
| Top | 0.276 | 0.428 | 0.284 | 0.329 |
| Middle | 0.433 | 0.599 | 0.264 | 0.432 |
| Bottom | 0.487 | 0.572 | 0.321 | 0.460 |
| Average | 0.399 | 0.533 | 0.290 | 0.407 |

The dry film thicknesses in the table above show little, if any, sagging within the coated area, demonstrating the benefit of replacing 2-butoxyethanol with the coalescent bis(2-ethylhexanoate)triethyleneglycol (Solusolv™ 2075) when fibers are present in the formulation. In addition, inclusion of the noted coalescent significantly reduced and/or eliminated the potential for VOC release.

Examples 5 and 6 show similar results as compared to Examples 3 and 4, but at a relative humidity of 65%.

EXAMPLE 5

Comparative Sample

Formulation 3 was tested at 24° C. with a 65% relative humidity. In particular, the formulation included 2-butoxyethanol as the coalescent and fibers. After applying the material, none of the material slid below the originally coated area, but the top portion of the coated area was observed to be moving downward, resulting in a very thin covering near the top. The following table shows the dry film thicknesses in the area where material had been applied.

EXAMPLE 5

Results

|  | Left Average (dft; mm): | Center Average (dft; mm): | Right Average (dft; mm): | Overall Average (dft; mm): |
|---|---|---|---|---|
| Top | 0.064 | 0.074 | 0.199 | 0.112 |
| Middle | 0.051 | 0.550 | 0.335 | 0.312 |
| Bottom | 0.636 | 0.367 | 0.388 | 0.464 |
| Average | 0.250 | 0.330 | 0.307 | 0.296 |

The dry film thicknesses in the table above clearly show sagging within the coated area for the disclosed formulation which contains 2-butoxyethanol as the coalescent and fibers.

Example 6

Formulation 4 was tested at 24° C. with a 65% relative humidity. After applying the material, no sagging or sliding was observed. The following table shows the dry film thicknesses in the area where material had been applied.

EXAMPLE 6

Results

|  | Left Average (dft; mm): | Center Average (dft; mm): | Right Average (dft; mm): | Overall Average (dft; mm): |
|---|---|---|---|---|
| Top | 0.491 | 0.350 | 0.900 | 0.580 |
| Middle | 0.520 | 0.407 | 0.189 | 0.372 |
| Bottom | 0.201 | 0.201 | 0.332 | 0.245 |
| Average | 0.404 | 0.319 | 0.474 | 0.399 |

The dry film thicknesses in the table above show no sagging within the coated area. In fact, the thicknesses at the top are higher than the bottom. This result is probably due to uneven application of the material, which was done by hand. Such an uneven application would be expected to encourage sagging, but yet none was observed or measured. Again, this demonstrates the benefit in hangability by replacing 2-butoxyethanol with the coalescent bis(2-ethylhexanoate)triethyleneglycol (Solusolv™ 2075) when fibers are present in the formulation. In addition, inclusion of the noted coalescent significantly reduced and/or eliminated the potential for VOC release.

Examples 7 and 8 show the additional benefit from adding clay to the formulation.

EXAMPLE 7

Comparative Sample

To determine whether the inclusion of clay in the disclosed intumescent formulations improved hangability, the procedure was the same as Examples 1 to 6 above, except the amount of wet material coated on the coupons was increased from 3.1 to 3.66 grams. The increased coating material resulted in the sagging of this formulation (as shown below) and allowed the benefits of clay in the formulation to be observed. Formulation 4 was tested at 24° C. with a 45% relative humidity.

After applying the material, none of the material slid below the originally coated area, but the top portion of the coated area was observed to be moving downward, resulting in a very thin covering near the top. The following table shows the dry film thicknesses in the area where material had been applied.

EXAMPLE 7

Results

|  | Left Average (dft; mm): | Center Average (dft; mm): | Right Average (dft; mm): | Overall Average (dft; mm): |
|---|---|---|---|---|
| Top | 0.214 | 0.146 | 0.163 | 0.174 |
| Middle | 0.428 | 0.700 | 0.468 | 0.532 |
| Bottom | 0.422 | 0.966 | 0.588 | 0.659 |
| Average | 0.355 | 0.604 | 0.406 | 0.455 |

The dry film thicknesses in the table above clearly show sagging within the coated area for Formulation 4, which contains fibers and the coalescent bis(2-ethylhexanoate) triethyleneglycol (Solusolv™ 2075) at this higher weight of coating.

EXAMPLE 8

Formulation 5 was prepared identical to Formulation 4, except that part of the Titania (powdered solid) was replaced with Bentonite clay. The resultant clay concentration was 1% of the total formulation. To determine whether the clay improved hangability, the procedure was the same as Example 7. Formulation 5 was tested at 24° C. with a 45% relative humidity.

After applying the material, no sagging or dripping was observed. The following table shows the dry film thicknesses in the area where material had been applied.

EXAMPLE 8

Results

|  | Left Average (dft; mm): | Center Average (dft; mm): | Right Average (dft; mm): | Overall Average (dft; mm): |
|---|---|---|---|---|
| Top | 0.483 | 0.456 | 0.272 | 0.404 |
| Middle | 0.293 | 0.562 | 0.493 | 0.449 |
| Bottom | 0.734 | 0.411 | 0.496 | 0.547 |
| Average | 0.503 | 0.476 | 0.420 | 0.467 |

The dry film thicknesses in the table above show very little sagging within the coated area, demonstrating the benefit of adding clay to the formulation containing fibers and the coalescent bis(2-ethylhexanoate)triethyleneglycol (Solusolv™ 2075) at the higher weight of coating. Moreover, inclusion of the noted coalescent significantly reduced and/or eliminated the potential for VOC release.

EXAMPLE 9

Comparative Sample

Formulation 6 was prepared identical to Formulation 4, except that the coalescent bis(2-ethylhexanoate)triethyleneglycol (Solusolv™ 2075) was replaced with dioctyl phthalate (available from Sigma-Aldrich Chemical Co.). Formulation 6 was tested at 24° C. with a 45% relative humidity.

After applying the material, none of the material dripped below the originally coated area, but the top portion of the coated area was observed to be moving downward ("sagging"), resulting in a very thin coating near the top. The following table shows the dry film thicknesses in the area where material had been applied.

EXAMPLE 9

Results

|  | Left Average (dft; mm): | Center Average (dft; mm): | Right Average (dft; mm): | Overall Average (dft; mm): |
| --- | --- | --- | --- | --- |
| Top | 0.135 | 0.240 | 0.102 | 0.159 |
| Middle | 0.479 | 0.222 | 0.457 | 0.386 |
| Bottom | 0.312 | 0.270 | 0.478 | 0.353 |
| Average | 0.309 | 0.244 | 0.346 | 0.299 |

The dry film thicknesses in the table above show sagging within the coated area for Formulation 6, which contains dioctyl phthalate as the coalescent and fibers.

EXAMPLE 10

Comparative Sample

Formulation 7 was prepared identical to Formulation 4, except that the coalescent bis(2-ethylhexanoate)triethyleneglycol (Solusolv™ 2075) was replaced with dipropyleneglycol, methyl ether (glycol Ether DPM available from Ashland, Inc.). Formulation 7 was tested at 24° C. and with a 45% relative humidity.

After applying the material, none of the material dripped below the originally coated area, but the top portion of the coated area was observed to be moving downward ("sagging"), resulting in a very thin covering near the top. The following table shows the dry film thicknesses in the area where material had been applied.

EXAMPLE 10

Results

|  | Left Average (dft; mm): | Center Average (dft; mm): | Right Average (dft; mm): | Overall Average (dft; mm): |
| --- | --- | --- | --- | --- |
| Top | 0.284 | 0.332 | 0.084 | 0.233 |
| Middle | 0.423 | 0.197 | 0.573 | 0.398 |
| Bottom | 0.491 | 0.636 | 0.446 | 0.524 |
| Average | 0.399 | 0.388 | 0.368 | 0.385 |

The dry film thicknesses in the table above show sagging within the coated area for Formulation 7, which contains dipropyleneglycol, methyl ether as the coalescent and fibers.

EXAMPLE 11

Formulation 8 was prepared identical to Formulation 4, except that the coalescent bis(2-ethylhexanoate)triethyleneglycol (Solusolv™ 2075) was replaced with 2,2,4-trimethyl-1,3-pentanediolmono(2-methylpropanoate) (Texanol Ester Alcohol available from Sigma-Aldrich Chemical Co.). Formulation 8 was tested at 24° C. and with a 45% relative humidity.

After applying the material, no sagging or sliding was observed. The following table shows the dry film thicknesses in the area where material had been applied.

EXAMPLE 11

Results

|  | Left Average (dft; mm): | Center Average (dft; mm): | Right Average (dft; mm): | Overall Average (dft; mm): |
| --- | --- | --- | --- | --- |
| Top | 0.440 | 0.422 | 0.296 | 0.386 |
| Middle | 0.610 | 0.282 | 0.470 | 0.454 |
| Bottom | 0.419 | 0.390 | 0.483 | 0.431 |
| Average | 0.490 | 0.365 | 0.416 | 0.424 |

The dry film thicknesses in the table above show very little, if any, sagging within the coated area, demonstrating the benefit of the coalescent 2,2,4-trimethyl-1,3-pentanediolmono(2-methylpropanoate) when fibers are present in the formulation. In addition, the coalescent 2,2,4-trimethyl-1,3-pentanediolmono(2-methylpropanoate) significantly reduced and/or eliminated the potential for VOC release.

EXAMPLE 12

Comparative Example

Formulation 9 was prepared the same as Formulation 4, except that the coalescent bis(2-ethylhexanoate)triethyleneglycol (Solusolv™ 2075) was replaced with propylene glycol monomethyl ether acetate (Glycol Ether PM Acetate available from Ashland, Inc.). Formulation 9 was tested at 24° C. and with a 45% relative humidity.

After applying the material, no sagging or sliding was observed. The following table shows the dry film thicknesses in the area where material had been applied.

EXAMPLE 12

Results

|  | Left Average (dft; mm): | Center Average (dft; mm): | Right Average (dft; mm): | Overall Average (dft; mm): |
| --- | --- | --- | --- | --- |
| Top | 0.482 | 0.258 | 0.483 | 0.408 |
| Middle | 0.293 | 0.463 | 0.417 | 0.391 |

-continued

|  | Left Average (dft; mm): | Center Average (dft; mm): | Right Average (dft; mm): | Overall Average (dft; mm): |
|---|---|---|---|---|
| Bottom | 0.553 | 0.261 | 0.360 | 0.391 |
| Average | 0.443 | 0.327 | 0.420 | 0.397 |

The dry film thicknesses in the table above show little, if any, sagging within the coated area, demonstrating the hangability-related benefits of the coalescent propylene glycol monomethyl ether acetate when fibers are present in the formulation. However, the coalescent propylene glycol monomethyl ether acetate did not reduce the potential for VOC release due to its low boiling point of 145° C.

The results in Examples 1 to 12 demonstrate that synergistic intumescent fireproofing compositions are provided according to the present disclosure, i.e., with reference to the intumescent formulations of Examples 4, 6, 8 and 11. In particular, advantageous intumescents are provided that exhibit a significantly reduced and/or eliminated potential for VOC release based on the use of at least two (2) coalescents—namely, bis(2-ethylhexanoate) triethyleneglycol and 2,2,4-trimethyl-1,3-pentanediolmono(2-methylpropanoate)—and that, when formulated in combination with fibers, e.g., glass fibers of 3 mm in length, exhibit highly desirable hangability properties. Each of the intumescent fireproofing compositions prepared in accordance with the present disclosure, i.e., the fireproofing compositions of Examples 4, 6, 8 and 11, also exhibit commercially acceptable fireproofing and/or fire retardant properties and a substantially smooth visual appearance when applied to a coupon/substrate. Of note, however, the experimental results further illustrate that certain coalescents that have the potential for reducing VOC release, specifically dioctyl phthalate and dipropyleneglycol methyl ether, were not effective in providing intumescents that exhibited acceptable hangability properties as part of the disclosed intumescent fireproofing formulations (see, e.g., Examples 9 and 10).

With specific reference to Example 7 (comparative) and Example 8, the experimental results set forth herein demonstrate the hangability benefits associated with inclusion of clay in the disclosed intumescent formulations. Indeed, the inclusion of clay in the noted formulation made it possible to significantly increase the coating thickness on the experimental coupon/substrate without encountering undesirable slipping or sagging.

Although the exemplary formulations of Examples 4, 6, 8 and 11 include glass fibers having a length of 3 mm, the present disclosure is not limited by or to such fiber systems. In particular and as noted above, alternative fiber systems may be employed, e.g., ceramic fibers such as mineral wool, alumina, alumina-magnesia-silica, aluminosilicate, silica, zirconia and quartz fibers, may be advantageously employed. In addition, fiber systems having differing fiber lengths may be employed. For example, advantageous intumescent formulations may be provided according to the present disclosure using glass fibers having a length of about 0.5 mm at a level of about 2% to 6% by weight of the overall formulation. Alternative advantageous intumescent systems may be provided that include glass fibers having a length of about 3 mm at a level of about 0.5% to 2.5% by weight of the overall formulation. It is also contemplated that fiber systems may be employed that include fiber blends of differing fiber lengths, e.g., 0.5 mm fibers and 3 min fibers. In applications that include fiber blends of differently-sized fibers, it may be desirable to vary the weight percentage of fibers included in the intumescent formulation to achieve desired results.

Although the present disclosure has been described with reference to exemplary embodiments and implementations, it is to be understood that the present disclosure is neither limited by nor restricted to such exemplary embodiments and/or implementations. Rather, the present disclosure is susceptible to various modifications, enhancements and variations without departing from the spirit or scope of the present disclosure. Indeed, the present disclosure expressly encompasses such modifications, enhancements and variations as will be readily apparent to persons skilled in the art from the disclosure herein contained.

The invention claimed is:

1. An intumescent fireproofing composition, comprising a formulation that includes:
   a. a resin;
   b. a coalescent; and
   c. glass fibers of a predetermined size;
   wherein the resin is a vinyl acetate copolymer;
   wherein the coalescent exhibits a boiling point of greater than 240° C., the coalescent is effective to substantially reduce or eliminate the potential for volatile organic compound (VOC) release, and the coalescent is selected from a group consisting of 2,2,4-trimethyl-1,3-pentanediolmono(2-methylpropanoate) and bis(2-ethylhexanoate) triethylene glycol;
   wherein the VOC is an organic compound exhibiting a boiling point greater than 250° C.;
   wherein the predetermined size of the glass fibers is a length of between 0.2 mm and 3 mm; and
   wherein the intumescent fireproofing composition delivers effective fireproofing and hangability performance, the hangability performance being defined by an absence of sliding or sagging of the intumescent fireproofing composition,
   wherein sliding is a measure of movement of the intumescent fireproofing composition from an application position on a coated area to a position below the coated area due to gravity, and
   wherein sagging is a measure of an increase in coating thickness from an applied thickness of the intumescent fireproofing composition to a final thickness defined by at least a two-fold increase in thickness from top to bottom of the coated area due to gravity.

2. The intumescent fireproofing composition according to claim 1, wherein the formulation is water-based.

3. The intumescent fireproofing composition according to claim 1, wherein the formulation further includes a defoamer and thickener.

4. The intumescent fireproofing composition according to claim 1, wherein the formulation further includes at least one of titania, a polyphosphate, melamine and pentaerythritol.

5. The intumescent fireproofing composition according to claim 1, wherein the glass fibers are included in the formulation at a level of between about 0.5% and 6% by weight.

6. The intumescent fireproofing composition according to claim 1, wherein the predetermined size of the glass fibers is a length of between about 2 mm and 3 mm.

7. The intumescent fireproofing composition according to claim 1, further comprising ceramic fibers selected from the group consisting of mineral wool, alumina, alumina-magnesia-silica, aluminosilicate, silica, zirconia and quartz fibers.

8. The intumescent fireproofing composition according to claim 1, wherein the hangability performance is determined based on the intumescent fireproofing composition at the applied thickness of at least 0.25 mm.

9. The intumescent fireproofing composition according to claim 1, wherein the formulation further comprises a constituent that is effective to decrease or eliminate potentially unpleasant odors.

10. The intumescent fireproofing composition according to claim 9, wherein the constituent is selected from the group consisting of methyl salicylate, benzaldehyde, trans-cinnamonaldehyde and vanillin.

11. The intumescent fireproofing composition according to claim 1, wherein the formulation further comprises clay.

12. The intumescent fireproofing composition according to claim 11, wherein the clay is included in the formulation at a level of about one percent by weight.

13. A method for providing fireproofing protection to a substrate, comprising:
   a. providing a fireproofing composition having a formulation that includes
      (i) a resin; (ii) a coalescent; and (iii) glass fibers of a predetermined size;
   b. applying the fireproofing composition to the substrate;
   wherein the resin is a vinyl acetate copolymer;
   wherein the coalescent exhibits a boiling point of greater than 240°C., the coalescent is effective to substantially reduce or eliminate the potential for volatile organic compound (VOC) release, and the coalescent is selected from a group consisting of 2,2,4-trimethyl-1,3-pentanediolmono(2-methylpropanoate) and bis(2-ethylhexanoate) triethylene glycol;
   wherein the VOC is an organic compound exhibiting a boiling point greater than 250° C.;
   wherein the predetermined size of the glass fibers is a length of between 0.2 mm and 3 mm; and
   wherein the intumescent fireproofing composition delivers effective fireproofing and hangability performance when applied to the substrate, the hangability performance being defined by an absence of sliding or sagging of the intumescent fireproofing composition,
   wherein sliding is a measure of movement of the intumescent fireproofing composition from an application position on a coated area to a position below the coated area due to gravity, and
   wherein sagging is a measure of an increase in coating thickness from an applied thickness of the intumescent fireproofing composition to a final thickness defined by at least a two-fold increase in thickness from top to bottom of the coated area due to gravity.

14. The method according to claim 13, wherein the formulation is water-based.

15. The method according to claim 13, wherein the formulation further includes a defoamer and thickener.

16. The method according to claim 13, wherein the formulation further includes at least one of titania, a polyphosphate, melamine and pentaerythritol.

17. The method according to claim 13, wherein the glass fibers are included in the formulation at a level of between about 0.5% and 6% by weight.

18. The method according to claim 13, wherein the predetermined size of the fibers is a length of between about 2 mm and 3 mm.

19. The method according to claim 13, wherein the hangability performance is determined based on the intumescent fireproofing composition at an applied thickness of at least 0.25 mm.

20. The method according to claim 13, wherein the formulation further comprises a constituent that is effective to decrease or eliminate potentially unpleasant odors.

21. The method according to claim 20, wherein the constituent is selected from the group consisting of methyl salicylate, benzaldehyde, trans-cinnamonaldehyde and vanillin.

22. The method according to claim 13, wherein the formulation further comprises clay.

23. The method according to claim 22, wherein the clay is included in the formulation at a level of about one percent by weight.

* * * * *